(12) United States Patent
Volokh et al.

(10) Patent No.: US 11,554,426 B2
(45) Date of Patent: Jan. 17, 2023

(54) ROTARY CUTTING TOOL HAVING CHIP SPACE IN PROPORTION TO FEED-PER-TOOTH

(71) Applicant: YG-1 Co., Ltd., Incheon (KR)

(72) Inventors: Vladimir Volokh, Nahariya (IL);
Young Koon Park, Incheon (KR);
Hyung Suk Kim, Seoul (KR); Hyun Seok Oh, Incheon (KR)

(73) Assignee: YG-1 Co., Ltd., Incheon (KR)

( * ) Notice: Subject to any disclaimer, the term of this patent is extended or adjusted under 35 U.S.C. 154(b) by 75 days.

(21) Appl. No.: 16/872,026

(22) Filed: May 11, 2020

(65) Prior Publication Data

US 2021/0331257 A1   Oct. 28, 2021

(30) Foreign Application Priority Data

Apr. 28, 2020 (KR) .................. 10-2020-0051553

(51) Int. Cl.
*B23C 5/10* (2006.01)
*B23B 51/02* (2006.01)
*B23C 5/00* (2006.01)

(52) U.S. Cl.
CPC ............ *B23C 5/10* (2013.01); *B23B 51/02* (2013.01); *B23C 5/006* (2013.01); *B23B 2251/402* (2013.01); *B23B 2251/408* (2013.01); *B23C 2210/405* (2013.01)

(58) Field of Classification Search
CPC ............ B23C 5/006; B23C 2210/28; B23C 2210/282; B23C 2210/32; B23C 2210/40; B23C 2210/402; B23C 2210/405; B23C 2210/407; B23B 2251/28; B23B 2251/282; B23B 2251/40; B23B 2251/402; B23B 2251/404; B23B 2251/406
See application file for complete search history.

(56) References Cited

U.S. PATENT DOCUMENTS

| 6,742,968 | B1 | 6/2004 | Volokh .......................... 407/34 |
| 9,333,565 | B2 | 5/2016 | Volokh |
| 2013/0315681 | A1 | 11/2013 | Volokh .......................... 407/53 |
| 2017/0087645 | A1* | 3/2017 | Haimer .................... B23C 5/10 |
| 2019/0039153 | A1 | 2/2019 | Pittala |

FOREIGN PATENT DOCUMENTS

| CN | 101920354 A | 12/2010 |
| DE | 203 04 580 U1 | 9/2004 |

(Continued)

OTHER PUBLICATIONS

English translation of WO 2017198265 (Year: 2017).*

(Continued)

*Primary Examiner* — Alan Snyder
(74) *Attorney, Agent, or Firm* — Stein IP, LLC

(57) ABSTRACT

A rotary cutting tool that implements a chip space in proportion to a feed-per-tooth is proposed. The rotary cutting tool includes a cutting part in which a plurality of cutting teeth and flutes are alternately formed, wherein a cross-section of the cutting part perpendicular to a central axis is divided into a plurality of cutting tooth spaces defining a section between cutting edges of adjacent cutting teeth on the basis of the central axis, such that all of the cutting tooth spaces are designed in different sizes, or some of the plurality of cutting tooth spaces are set in different sizes from the other cutting tooth spaces.

11 Claims, 4 Drawing Sheets

(56) References Cited

FOREIGN PATENT DOCUMENTS

| | | |
|---|---|---|
| DE | 10 2005 002 698 A1 | 7/2006 |
| DE | 10 2012 019 801 A1 | 4/2014 |
| DE | 10 2014 108 513 A1 | 12/2015 |
| DE | 10 2015 116 443 A1 | 3/2017 |
| DE | 10 2016 109 130 A1 | 11/2017 |
| DE | 11 2016 003 924 T5 | 5/2018 |
| FR | 2875722 A | 3/2006 |
| JP | 2007-136657 A | 6/2007 |
| JP | 2013-202748 A | 10/2013 |
| KR | 10-2013-0074962 A | 7/2013 |
| KR | 10-2015-0030862 A | 3/2015 |
| KR | 10-2015-0115782 A | 10/2015 |
| WO | WO-2017198265 A1 * 11/2017 ............... B23C 5/10 |

OTHER PUBLICATIONS

Office Action issued by the Korean Intellectual Property Office dated Jun. 30, 2020 for corresponding Korean Application No. 10-2020-0051553.
Office Action issued by the Russian Patent Office dated Sep. 8, 2020 for corresponding Russian Application No. 2020115561.
Office Action issued by the German Patent and Trademark Office dated Jan. 21, 2021 for corresponding German Application No. 10 2020 002 866.7.
Indian Office Action dated Dec. 21, 2021, issued to Indian Application No. 202034027277.

* cited by examiner

ROTARY CUTTING TOOL HAVING CHIP SPACE IN PROPORTION TO FEED-PER-TOOTH

CROSS-REFERENCE TO RELATED APPLICATIONS

This application claims the benefit of Korean Application No. 10-2020-0051553, filed Apr. 28, 2020, in the Korean Intellectual Property Office. The disclosures of the document named above is incorporated herein by reference.

BACKGROUND OF THE INVENTION

Field of the Invention

The present invention relates to a rotary cutting tool that implements a chip space in proportion to actual feed-per-tooth by setting the width and depth of each flute in proportion to actual feed-per-tooth.

Description of the Related Art

Rotary cutting tools include end mills, drills, reamers, and the like. Such cutting rotary tools such as end mills or drills are widely used for precise metal machining. The rotary cutting tool such as an end mill is a tool having a cutting part included front end and OD cutting part with teeth along a central axis as a rotary axis, and a shank part formed at a rear end extending from the cutting part. The OD cutting part (outer edges) provided on the side of the cutting teeth is used to cut the side of a workpiece, and the front end with bottom edge is used to cut the "floor surfaces" of a workpiece. The cutting part has a core disposed along the central axis, and cutting teeth and flutes are alternately arranged on the outer circumference (OD) of the core.

The materials of such rotary cutting tools may include high speed steel, solid carbide, cubic boron nitride, polycrystal diamond, cermets, ceramics, and combinations thereof. These materials are coated with various materials after shape processing in order to extend the service life of end mills.

Such rotary cutting tools may be used for a variety kind of machining, and thus need to be designed in different shapes to fit respective machining because machining characteristics are different from each other for respective machining. For example, End mills for slotting operation design with different geometry compare to finishing end mills. Slotting and Rough side cutting operations needs to remove metal at the maximum stock removal, and finish side cutting is used for precision finish that allows for a relatively smooth surface finish near the target dimensions. Different tools are usually required for different stages of machining, and changing tools requires time for new settings.

The tool characteristics for slotting, rough side cutting, and finish side cutting are related to the 'core diameter ratio', which is the ratio of core diameter d to tool diameter D, and the number of flutes. The tool characteristics are very important parameters associated with individual machining characteristics, tool stiffness and chip evacuation. Basically, the diameter D of the entire tool is composed of the core diameter or the depth of the depth of flute.

Since the depths of the flutes are constant, the cross section of the core may be specified to have a circular shape, so the core diameter is defined as the spacing between the bottoms of the flutes on both sides of the core for even #(number) of teeth and OD −2 H of teeth for odd #(number) of teeth. Deep cutting teeth create good chip clearance so that lubricant can be easily supplied thereto, but the tool stiffness is deteriorated.

For example, depending on the material of a workpiece, the core diameter ratio in slotting for an end mill with two or three flutes is preferably about 40% to 55%, and the core diameter ratio in rough side cutting for an end mill with four flutes is preferably about 50% to 65%. For finishing an end mill with 4-8 flutes, the core diameter ratio in the finish side cutting is preferably about 60% to 85%.

As illustrated in FIG. 1, when the core section is designed to have multiple sections, a slotting operation, a rough side cutting operation, and a finishing operation may be combined into a single end mill.

The core section may also be design to have, instead of the multi-stage section, a tapered, convex or concave shape in which the core diameter gradually increases from the front end of the cutting part toward the shank part, which contributes to the reinforcement of the tool stiffness and the vibration damping.

Tools that can perform all of slotting, rough side cutting and finish side cutting have been studied. For example, U.S. Pat. No. 6,742,968 (Milling Cutter) or U.S. Pat. No. 9,333,565 (Rotary cutter) can perform all of slotting, rough side cutting and finish side cutting with one cutting tool.

In U.S. Pat. No. 6,742,968, the overall cross-sectional area when viewed in the direction orthogonal to a cutter axis, in particular the core diameter, gradually increases from the front end of the cutting part toward the shank part. This design provides a cutter having adequate chip clearance and improved rigidity in combination.

In U.S. Pat. No. 9,333,565, the core is designed to have a shape in which a plurality of sections is divided in different forms. FIG. 1 illustrates a rotary cutter of U.S. Pat. No. 9,333,565. In the rotary cutter of FIG. 1, although the overall outer diameter D of the cutter is constant, the cutting part 24 is divided into four sections 28, 30, 32, and 34. Each section has its own core shape and length. It can be seen that the core diameter is designed to increase from the first sub-section 28 to the forth sub-section 34 even though the overall outer diameter D is constant.

SUMMARY OF THE INVENTION

Accordingly, the present invention has been made keeping in mind the above problems occurring in the related art, and an objective of the present invention is to provide a rotary cutting tool in which a chip space of each flute along cutting length is implemented in proportion to actual feed-per-tooth and section of cutting length by setting the width and depth of each flutes in a different fashion.

Another objective of the present invention is to provide a rotary cutting tool designed to perform all of slotting, rough side cutting, and finish side cutting with one end mill by optimization of flutes geometry.

In order to achieve the above objectives, according to one aspect of the present invention, there is provided a rotary cutting tool including a cutting part in which a plurality of cutting teeth and flutes are alternately formed. Here, a cross-section of the cutting part perpendicular to a central axis is divided into a plurality of 'cutting tooth spaces' (sectors) defining a section between cutting edges of adjacent cutting teeth on the basis of the central axis, such that all of the cutting tooth spaces are designed in different sizes, or some of the plurality of cutting tooth spaces are set in different sizes from the other cutting tooth spaces so that the size of the flute space is formed to be bigger in proportion to the size of the cutting tooth space, thereby sufficiently securing a chip space in proportion to acting feed for each cutting tooth for optimizing the cutting performance. On the other hand, if necessary, the rotary cutting tool may include a shank part at a rear end of the cutting part.

According to an embodiment, it may be designed such that the larger the cutting tooth space, the wider the flute of the cutting tooth space is. In addition, it may also be designed such that the larger the cutting tooth space, the deeper the depth of the flute of the cutting tooth space is. And the depth and the width of the flute is deeper and wider in proportion to actual feed per tooth in the cutting tooth space.

Division of Core

According to an embodiment, a flute profile of each flute of the cutting part may be divided into a plurality of profile sections along the central axis on the basis of the change of the thicknesses of the core. Here, the thickness of the core is measured as the distance of the bottom of the flute in the cutting tooth space from the central axis.

Here, the plurality of the flute profile sections may include a slotting target section, a rough side cutting target section, and a finish side cutting target section sequentially arranged from the front end to the rear end of the cutting part. The flute profile sections may also include a connecting section connecting the side cutting target section to the rear end of the cutting part. In addition, at least one section selected from the plurality of sections may be machined into a tapered shape or other forms, for example concave or convex shapes, in which the core thickness gradually increases or decreases as it goes toward the rear end.

According to another embodiment, in addition to forming the flute of the cutting tooth space to be deeper in proportion to the size of the cutting tooth space, the length of all of the profile sections except for the section connected to the rear end of the cutting part may also be set to be longer in proportion to the depth of the flute.

According to the rotary cutting tool, when the rotary cutting tool in cross sections along central axis is divided into the plurality of cutting tooth spaces, the flute is formed to be wider and deeper in proportion to the size of the cutting tooth space, thereby securing a sufficient chip space in proportion to the size of the actual feed per tooth for each cutting tooth, and thus optimizing the cutting performance.

In addition, the rotary cutting tool of the present invention is designed to satisfy all of the machining characteristics of slotting, rough side cutting and finish side cutting, thereby performing all of the slotting, rough side cutting and finish side cutting with one end mill.

BRIEF DESCRIPTION OF THE DRAWINGS

The above and other objectives, features and advantages of the present invention will be more clearly understood from the following detailed description when taken in conjunction with the accompanying drawings, in which.

DETAILED DESCRIPTION OF THE INVENTION

Hereinbelow, exemplary embodiments of the present invention will be described in detail with reference to the accompanying drawings.

Figure 1:
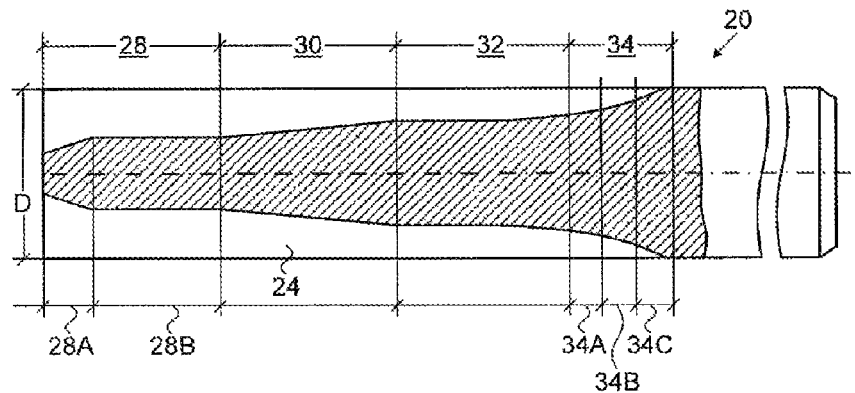
FIG. 1 is a partial cutaway side view illustrating a known end mill.
Figure 2:
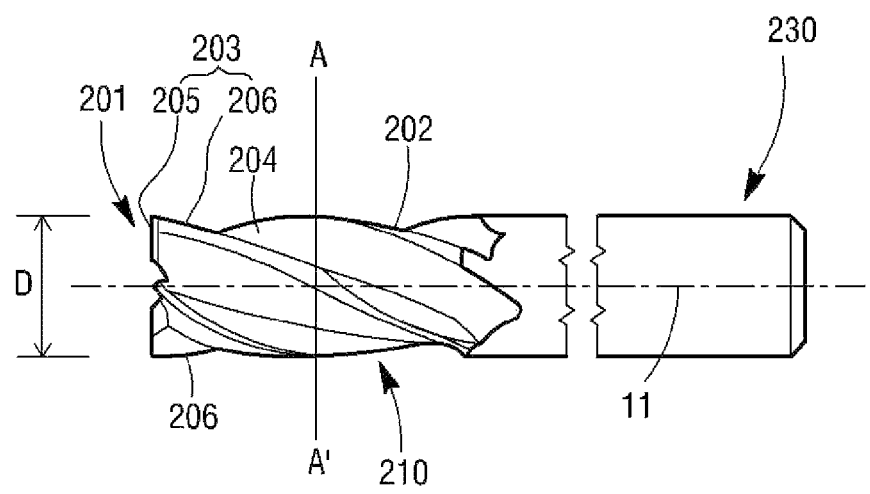
FIG. 2 is a view illustrating a side view of a rotary cutting tool according to an embodiment of the present invention.

Referring to FIG. 2, a rotary cutting tool 200 according to the present invention includes a cutting part 210 formed along a central axis 11 and a shank part 230 provided at a rear end of the cutting part 210. The rotary cutting tool corresponds to an end mill, a drill, or the like. Although the rotary cutting tool 200 of FIG. 2 illustrates a conventional solid-type end mill, the present invention is not limited thereto, but may also be applied to various types of rotary cutting tool s, such as a head divisional type or a brazing type. In addition, some rotary cutting tools may have a screw groove in the core at the rear end of the cutting part, instead of having the shank part 230 as illustrated in FIG. 2, and the present invention is also applied to this type of rotary cutting tool. However, the following description will be described based on FIG. 2 with the shank part 230. In case of the rotary cutting tool without the shank part, the shank part may correspond to a 'rear end of the cutting part'.

Although FIG. 2 illustrates a square-type rotary cutting tool 200 in which a front end 201 of the cutting part 210 is flat, the present invention may be applied to some of rotary cutting tool s known in the art. For example, the present invention may be applied to all of the ball-type, bull nose which are classified according to the shape of the cutting part 210 and the front end 201 and have constant OD and unequal flute space dividing. In addition, the shank part 230 may be machined into any shape, including a straight-type, a flat-type, a combination-type, or a taper-type shank.

The rotary cutting tool 200 to which the present invention is applied should have at least a plurality of side tooth 206. Taking the end mill illustrated in FIG. 2 as an example, the cutting part 210 alternately has cutting teeth 203 and flutes 204 across the front end 201 and a peripheral surface 202. The cutting tooth 203 includes a bottom tooth 205 provided at the front end 201 and a side tooth 206 formed on the peripheral surface to extend from the bottom tooth 205. The cutting tooth is arranged spirally or straight along a core of the cutting part disposed along the central axis 11.

However, the present invention optimizes the cutting performance of the rotary cutting tool by optimizing the flute chip space according to actual feed per tooth for each cutting tooth. In view of the fact that the feed-per-tooth is determined according to a central angle of the individual tooth space, the rotary cutting tool of the present invention is characterized in that the individual tooth spaces are set to have a different size. Here, the cutting tooth space refers to a space (or an angle thereof) occupied by the cutting tooth with respect to the central axis 11 in a cross-section perpendicular to the central axis 11 of the rotary cutting tool 200. The cutting tooth space is defined by a sector between the adjacent cutting edges. Therefore, the cross section of the rotary cutting tool with four cutting teeth is divided into four cutting tooth spaces, and the cross section of the rotary cutting tool with five cutting edges is divided into five cutting tooth spaces. In the present invention, since the cutting tooth spaces are set not to be equal to each other, all cutting tooth spaces may be different, or otherwise some of the cutting tooth spaces may be the same the other may be different.

Figure 3:
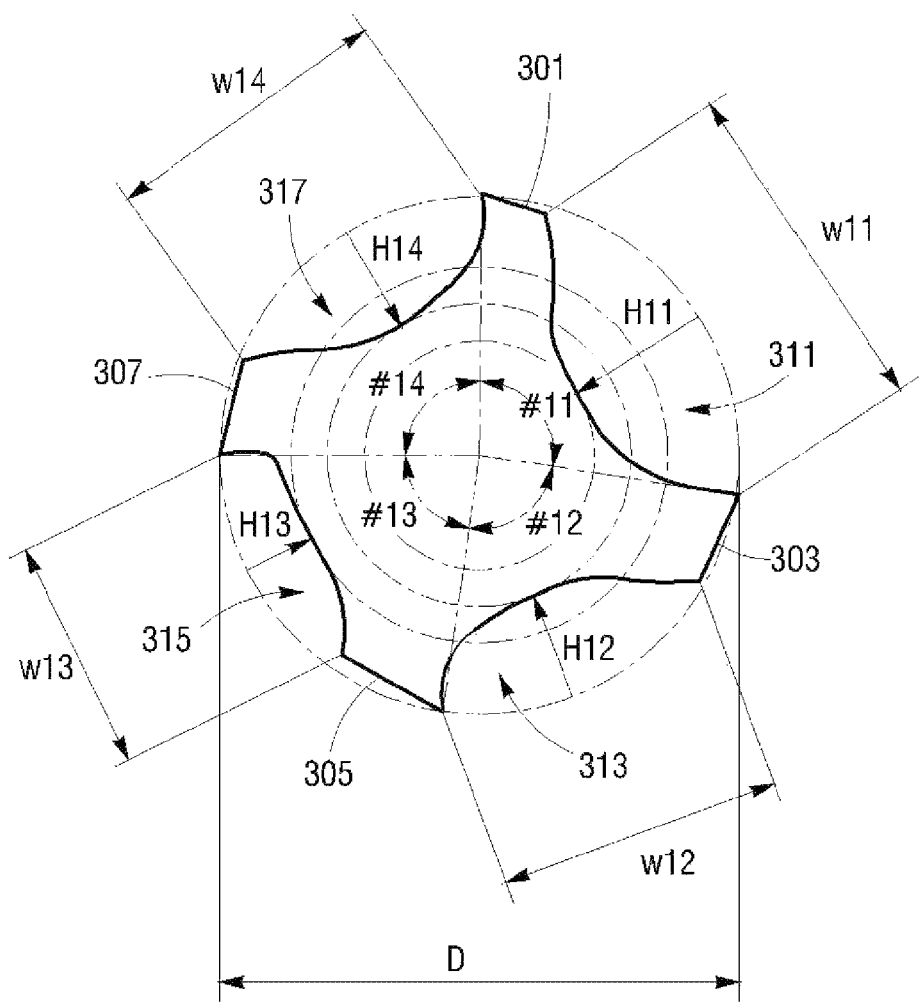
FIG. 3 is a cross-sectional view taken along line A-A' of FIG. 2 according to an embodiment of the present invention.

FIG. 3 illustrates an example in which four cutting teeth 301, 303, 305, and 307 and four flutes 311, 313, 315, and 317 are formed so that the cross section of the rotary cutting tool is divided into four different cutting tooth spaces. Referring to FIG. 3, as in Equation 1 below, the cutting tooth spaces are arranged such that an 1st cutting tooth space #11 is larger than a 2nd cutting tooth space #12, a 3rd cutting tooth space #13 is smaller than a 4th cutting tooth space #14, and the 2nd cutting tooth space #12 and the 4th cutting tooth space #14 have the same size.

$$\#11 > \#12 = \#14 > \#13 \qquad \text{[Equation 1]}$$

Since the cutting tooth space consists of sections occupied by the lands of the cutting tooth and a section occupied by the flute, if the cutting tooth spaces are not equal to each other in the rotary cutting tool 200, the lands of the cutting teeth may have a different size, the flutes may have a different width, or both the size of the lands and the width of the flute may be different. However, in consideration of the fact that the feed per tooth increases in proportion to the size of the cutting tooth space, it is preferable to sufficiently secure the chip space by forming the flute space bigger in proportion to the size of the cutting tooth space. In other words, it is preferable to form the flute wider and deeper in proportion to the size of the cutting tooth space.

FIG. 3 illustrates an example in which the widths of the flutes are not equal to each other so that the widths of the flutes vary in proportion to the size of the cutting tooth space. Thus, the widths of the flutes are arranged such that an 1st flute width w11 is wider than a 2nd flute width w12, a 3rd flute width w13 is narrower than a 4th flute width w14, and the 2nd flute width w12 and the 4th flute width w14 have the same size. According to this configuration in which the cutting tooth spaces have a different size, and the flute chip space is increased as the cutting tooth space increases, the flute chip space is optimized depending on the feed-per-tooth.

In addition, according to an embodiment, as illustrated in FIG. 3, the depths of the flutes may be set differently in proportion to the size of the cutting tooth space. Thus, the depths of the flutes are arranged such that an 1st flute depth H11 is deeper than a 2nd flute depth H12, a 3rd flute depth H13 is shallower than a 4th flute depth H14, and the 2nd flute depth H12 and the 4th flute depth H14 have the same size. According to this configuration in which the flute chip space is increased as the cutting tooth space increases, the flute chip space is optimized depending on the feed-per-tooth. The feed-per-tooth according to the depth and width of the flute is shown in Equations 2 to 5 below. Here, Ft1 is an actual feed per tooth of an 1st cutting tooth, Ft2 is an actual feed per tooth of a 2nd cutting tooth, Ft3 is an actual feed per tooth of a 3rd cutting tooth, and Ft4 is an actual feed per tooth of a 4th cutting tooth.

$$\frac{H11}{H12} \approx \frac{Ft1}{Ft2} \qquad \text{[Equation 2]}$$

$$\frac{W11}{W12} \approx \frac{Ft1}{Ft2} \qquad \text{[Equation 3]}$$

$$\frac{H12}{H13} \approx \frac{Ft2}{Ft3} \qquad \text{[Equation 4]}$$

$$\frac{W12}{W13} \approx \frac{Ft2}{Ft3} \qquad \text{[Equation 5]}$$

On the other hand, it is preferable that the width and the depth of the flute are designed to be correlated with each other according to the actual feed-per-tooth. Therefore, as in FIG. 3, the wider the flute, the deeper the flute is, and conversely, the narrower the flute, the shallower the flute is. Meanwhile, during designing the end mill, the width and depth of the flutes might not be direct proportional to the actual feed per tooth and depend of land width of the cutting tooth.

The present invention is characterized in that the size of the cutting tooth space is not the same, and which cutting tooth space to be set relatively large will be determined according to the design purpose of the corresponding rotary cutting tool 200. Accordingly, although as in FIG. 3, the 1st cutting tooth space #11 is larger than the 2nd cutting tooth space #12, the 3rd cutting tooth space #13 is smaller than the 4th cutting tooth space #14, and the 2nd cutting tooth space #12 and the 4th cutting tooth space #14 have the same size, which is only an example, the present invention may employ other arrangements depending on the design specifications of the rotary cutting tool.

In addition, in the example of FIG. 3, the land width of the 1st cutting edge 301 is designed to be relatively narrowest while the 1st cutting tooth space #11 is formed to have the largest size. However, this design is only an option. In other words, the land width of the cutting tooth is not an important matter in the present invention, and can be selectively determined according to the strength of the cutting tooth and/or the maximum cutting forces.

Figure 4:
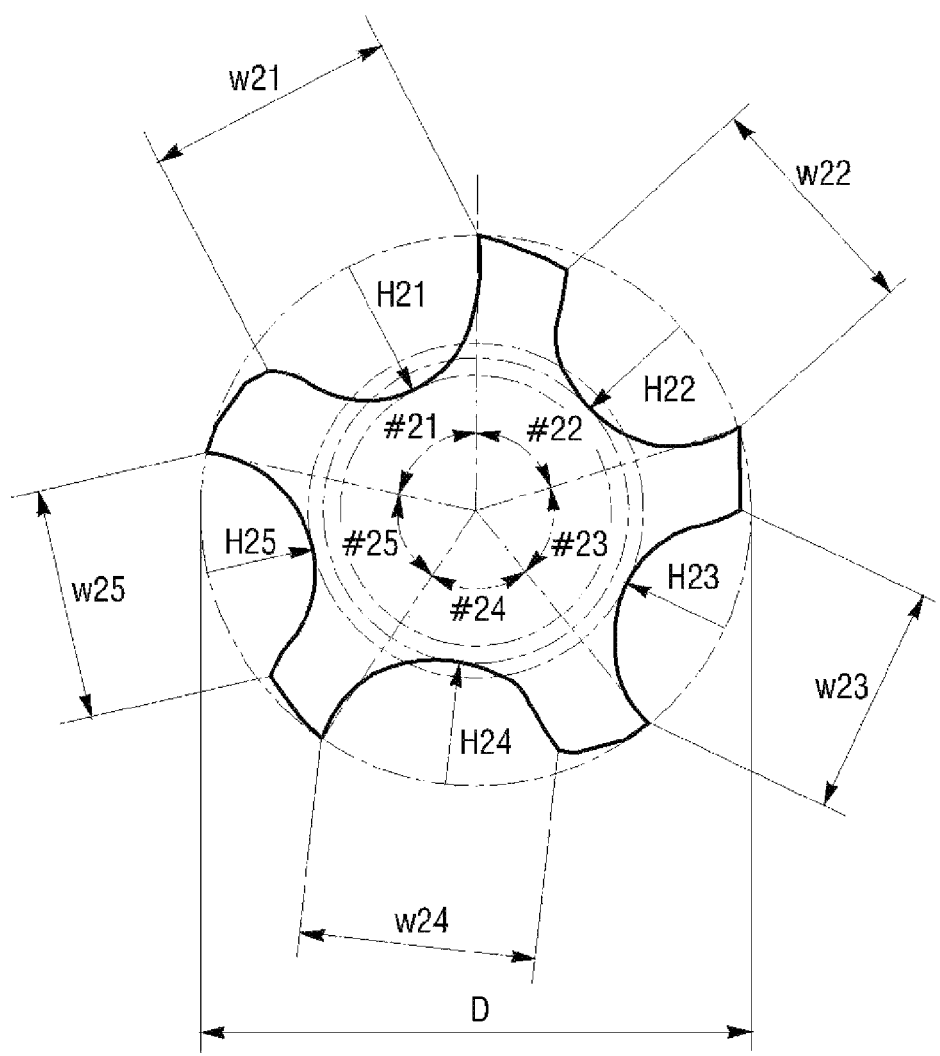
FIG. 4 is a cross-sectional view taken along line A-A' of FIG. 2 according to another embodiment of the present invention.

FIG. 4 illustrates an example in which 5 cutting teeth and 5 flutes are formed such that a 1st cutting tooth space #21 is larger than a 2nd cutting tooth space #22, the 2nd cutting tooth space #22 is larger than a 3rd cutting tooth space #23, a 4th cutting tooth space #24 has the same size as the 2nd cutting tooth space #22, and a 5th cutting tooth space #25 has the same size as the 3rd cutting tooth space #23.

Depending on the size of the cutting tooth space, a 1st flute depth H21 is deeper than a 2nd flute depth H22, the 2nd flute depth H22 is deeper than a 3rd flute depth H23, a 4th flute depth H24 has the same size as the 2nd flute depth H22, and a 5th flute depth H25 has the same size as the 3rd flute depth H23. In association with the flute depths, a 1st flute width w21 is wider than a 2nd flute width w22, the 2nd flute width w22 is wider than a 3rd flute width w23, a 4th flute width w24 has the same size as the 2nd flute width w22, and a 5th flute width w25 has the same size as the 3rd flute width w23.

As in FIGS. 3 and 4, the cross-sectional geometry of the flute is optional according to the design specifications of the rotary cutting tool. Therefore, the cross-sectional geometry of the flute may be designed in consideration of the strength, relief shape, and the like of the cutting tooth.

Meanwhile, since the depths of the flutes are not the same in FIGS. 3 and 4, the core of the cutting part 210 is not circular. Therefore, it is not possible to define the core diameter in the rotary cutting tool of FIGS. 3 and 4 possible to define depth of tooth and flute profile along central axis. However, with respect to the central axis 11, the deeper the flute is formed, the smaller distance from maximum flute depth to central axis in each cross section.

Figure 5:
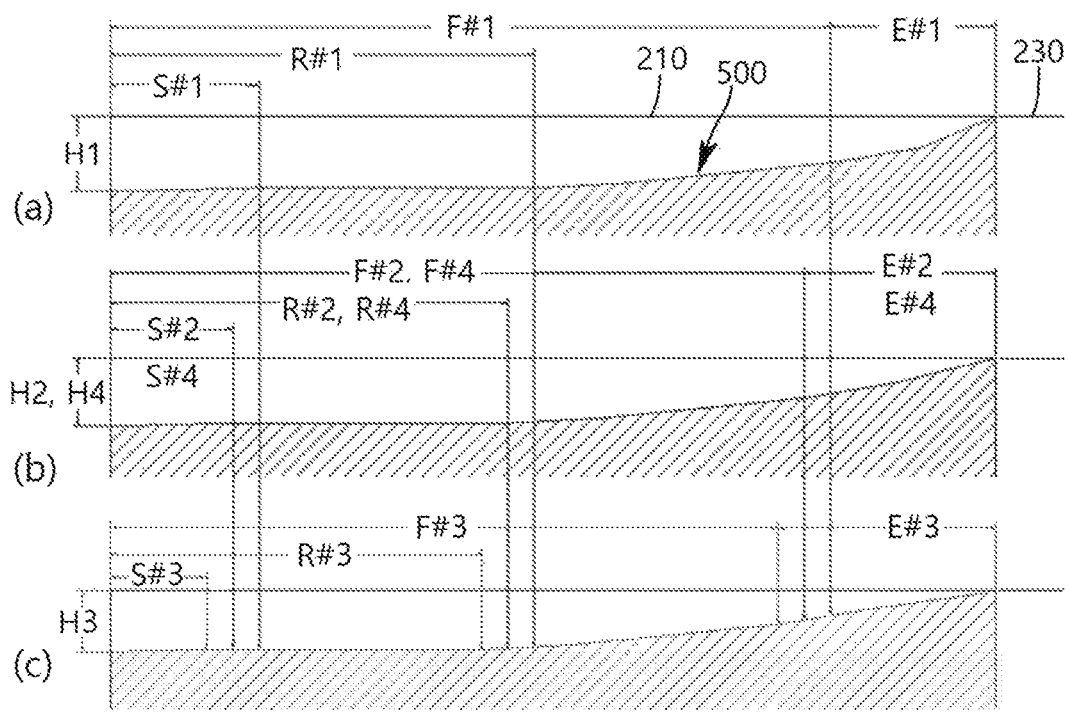
FIG. 5 is a view conceptually illustrating the shape of a cutting core of the rotary cutting tool of FIG. 3 according to an embodiment of the present invention.

Embodiment (FIG. 5)

Meanwhile, the rotary cutting tool 200 of the present invention may also be designed to perform all of slotting, rough side cutting, and finish side cutting by dividing the core 500 of the cutting part 210 into a plurality of sections by dividing each flute profile along central axis to sections.

It should be noted that since the rotary cutting tool 200 is configured such that the flutes having different depths spirally wind the core 500, the cross-sectional shape of the core 500 perpendicular to the central axis 11 is not constant along central axis. Therefore, if it is said that the distance from maximum flute depth to central axis of the core 500 in some of the sections gradually increases, equal or decreases, the distance from maximum flute depth to central axis of the core need to be measured by the height of the bottom of the individual flute with respect to the central axis 11. In other words, the constant of distance from maximum flute depth to central axis of the core in section means that although the bottom height of the plurality of flutes from the central axis 11 differs from each other, the bottom height of the plurality of flutes does not change in a specified section, and the increasing distance from maximum flute depth to central axis in a section means that the different bottom heights of the plurality of flutes gradually increase in the specified section.

FIG. 5 conceptually illustrates the flute profile of a core 500 of the cutting part 210 of the rotary cutting tool of FIG. 3 along individual flute. However, FIG. 5 is not a side cross-sectional view of the cutting part 210 cut across a single face passing through the central axis 11. FIG. 5A illustrates the flute profile of a core or flute height change of the core along the bottom of the 1st flute 311, FIG. 5B illustrates the flute profile of a core or flute height change of the core along the bottoms of the 2nd and 4th flutes 313 and 317, and FIG. 5C illustrates the flute profile of a core or flute height change of the core along the bottom of the 3rd flute 315. Referring to FIG. 5, as in FIG. 3, the depth of the flute is designed such that the 1st flute depth H1 is deeper than the 2nd flute depth H2, the 3rd flute depth H3 is shallower than the 4th flute depth H4, and the 4th flute depth H4 has the same size as the 42nd flute depth H2. In addition, the core 500 is provided such that bottoms of the four flutes 311, 313, 315, and 317 are machined in such a way that a slotting target region, a rough side cutting target region, and a finish side cutting target region are sequentially disposed from the front end of the cutting part 201 toward the shank part 230, and finally, a connecting portion is disposed between the finish side cutting target region and the shank part 230.

In FIG. 5, the distance from maximum flute depth to central axis of the core 500 is designed such that the distance from maximum flute depth to central axis of the core 500 in the slotting and rough side cutting regions is kept constant, while the distance from maximum flute depth to central axis of the core in the finish side cutting region gradually increases in a tapered shape. In the finish side cutting region, the depths of the 1st flute 311, the 2nd flute 313, the 3rd flute 315, and the 4th flute 317 are also proportionally reduced to fit the tapered shape.

Furthermore, the embodiment of FIG. 5 is implemented such that in addition to the width and depth of the flute changing in proportion to the size of the cutting tooth space, the lengths of the slotting target region, the rough side cutting target region, and the finish side cutting target region change in proportion to the size of the cutting tooth space. Therefore, it is configured such that the slotting target region S #1 of the 1st flute 311 is longer than the slotting target region S #2 of the 2nd flute 313, the slotting target region S #3 of the 3rd flute 315 is shorter than the slotting target region S #4 of the 4th flute 317, and the slotting target region S #4 of the 4th flute 317 has the same length as the slotting target region S #2 of the 2nd flute 313. Similarly, it is configured such that the rough side cutting target region R #1 of the 1st flute 311 is longer than the rough side cutting target region R #2 of the 2nd flute 313, the rough side cutting target region R #3 of the 3rd flute 315 is shorter than the rough side cutting target region R #4 of the 4th flute 317, and the rough side cutting target region R #4 of the 4th flute 317 has the same length as the rough side cutting target region R #2 of the 2nd flute 313. Further, it is configured such that the finish side cutting target region F #1 of the 1st flute 311 is longer than the finish side cutting target region F #2 of the 2nd flute 313, the finish side cutting target region F #3 of the 3rd flute 315 is shorter than the finish side cutting target region F #4 of the 4th flute 317, and the finish side cutting target region F #4 of the 4th flute 317 has the same length as the finish side cutting target region F #2 of the 2nd flute 313.

Through this embodiment, it is possible to secure the rigidity of the core and minimize vibration in the side cutting regions while securing a sufficient chip space in the slotting target region.

Although the present invention has been illustrated and described with respect to preferred embodiments, the present invention is not limited to the above-described specific embodiments, it is apparent that various modifications can be made by those skilled in the art to which the invention belongs without departing from the spirit of the invention defined by claims, and these modifications should not be individually understood from the technical spirit or scope of the present invention.

What is claimed is:

1. A rotary cutting tool comprising:
a cutting part in which a plurality of cutting teeth and flutes are alternately formed, wherein a cross-section of the cutting part perpendicular to a central axis is divided into a plurality of cutting tooth spaces defining a region between near cutting edges of adjacent cutting teeth on the basis of the central axis, such that all of the cutting tooth spaces are designed in different sizes, or some of the plurality of cutting tooth spaces are set in different sizes from the other cutting tooth spaces, wherein a flute space in the each cutting tooth space is formed in proportion to the size of the cutting tooth space,
wherein a flute profile of each flute of the cutting part is divided into a plurality of flute profile sections along the central axis, on the basis of a change in distance from the bottom of each flute to the central axis, the plurality of flute profile sections of each flute including a first flute profile section and a second flute profile section, a depth of the first flute profile section being kept constant over an entire length of the first flute profile section,
wherein the depth of the first flute profile section of each flute is formed in proportion to a size of the cutting tooth space and the entire length of the first flute profile section is in proportion to the depth of the flute profile.

2. The rotary cutting tool according to claim 1, wherein a width of the flute in the cutting tooth space is wider as the cutting tooth space is larger.

3. The rotary cutting tool according to claim 2, wherein the depth and the width of the flute is deeper and wider as the cutting tooth space is larger.

4. The rotary cutting tool according to claim 1, wherein a depth of the flute in the cutting tooth space is deeper as the cutting tooth space is larger.

5. The rotary cutting tool according to claim 1, wherein a depth of the flute in the cutting tooth space is deeper as the cutting tooth space is larger in proportion to actual feed per tooth in the cutting tooth space.

6. The rotary cutting tool according to claim 1, wherein the width of the flute in the cutting tooth space is wider in proportion to actual feed per tooth.

7. The rotary cutting tool according to claim 1, wherein the plurality of the flute profile sections includes a slotting target section, a rough side cutting target section, a finish side cutting target section, and a connecting portion, sequentially arranged from a front end to a rear end of the cutting part.

8. The rotary cutting tool according to claim 7, wherein at least one section selected from the slotting target section, the rough side cutting target section, and the finish side cutting target section has a shape in which the distance from the bottom of the flute to the central axis gradually decreases as it goes toward the rear end.

9. The rotary cutting tool according to claim 1, wherein a depth of the second flute profile section is equal to or smaller than the depth of the first flute profile section.

10. The rotary cutting tool according to claim 9, wherein the depth of the second flute profile section gradually decreases over an entire length of the second flute profile.

11. The rotary cutting tool according to claim 1, wherein the cross-section of the cutting part perpendicular to the central axis remains unchanged over the entire length of the first flute profile section of a flute that has a smallest flute profile depth.

\* \* \* \* \*